United States Patent [19]
Gardiner

[11] 3,872,380
[45] Mar. 18, 1975

[54] METAL DETECTOR DISTINGUISHING BETWEEN DIFFERENT METALS BY USING A BIAS CIRCUIT ACTUATED BY THE PHASE SHIFTS CAUSED BY THE METALS

[76] Inventor: Robert F. Gardiner, 4729 N. 7th Ave., Phoenix, Ariz. 85013

[22] Filed: Jan. 2, 1974

[21] Appl. No.: 429,958

[52] U.S. Cl. ................................. 324/41, 324/3
[51] Int. Cl. .......................................... G01r 33/12
[58] Field of Search .................................. 324/41, 3

[56] References Cited
UNITED STATES PATENTS
| | | | |
|---|---|---|---|
| 3,020,470 | 2/1962 | Shawhan et al. | 324/3 |
| 3,676,772 | 7/1972 | Lee | 324/41 |

FOREIGN PATENTS OR APPLICATIONS
| | | | |
|---|---|---|---|
| 480,447 | 1/1952 | Canada | 324/41 |

OTHER PUBLICATIONS
Doll et al., Vehicular Mounted Mine Detector, Electronics, Jan. 1946, pp. 105–109.
Roston, B., Development of Locators of Small Metallic Bodies, Jour. of IEE, Dec. 1948. pp. 653–663.

*Primary Examiner*—Robert J. Corcoran
*Attorney, Agent, or Firm*—Cahill, Sutton & Thomas

[57] ABSTRACT

A metal detector is described utilizing a transmitting and receiving coil for detecting the presence of metal objects positioned in the field of the coils. As oscillator is utilized to generate a signal to be transmitted by the first of the coils and the signals detected by the second of the coils is amplified and applied to an indicator circuit. The detected signal is also applied to a wave shaping circuit which, in turn, switches flip-flop. The output of the oscillator is applied to a phase shifting circuit and a wave shaping circuit to shift the phase of the signal in a predetermined fashion. The shifted and shaped signal is applied to the above-mentioned flip-flop. The flip-flop output is applied to the indicator circuit. The type of metal present in the field of the coils will affect the amplitude and phase of the signal detected by the receiving coil. The phase change and the amplitude changes are thus detected and are utilized to determine the amplitude of the output of the indicator circuit which, in turn, is applied to a meter to present an indication of the type of metal being detected.

3 Claims, 2 Drawing Figures

METAL DETECTOR DISTINGUISHING BETWEEN DIFFERENT METALS BY USING A BIAS CIRCUIT ACTUATED BY THE PHASE SHIFTS CAUSED BY THE METALS

The present invention pertains to metal detectors, and more particularly, to a metal detector of the type that may be utilized for detecting valuable objects beneath the surface of the ground.

The use of metal detecting apparatus for locating valuable metallic objects is an art which in recent years has become increasingly more important. When attempting to locate valuable metal objects, it is important for the detecting apparatus to be able to accurately locate the metal object when the apparatus is passed over the object; typically, search coils are utilized for producing an electromagnetic field, the disturbance of which by an object yields some sort of an indication to the operator. Several difficulties present themselves to the construction of a suitable metal detecting apparatus for use in the location of valuable metallic objects. One significant desirable feature, which is difficult to obtain, is the ability of the detecting apparatus to distinguish between metal objects which have significant value, such as coins and the like, from non-valuable objects or trash, such as bottle caps or pulltabs from metallic containers.

Both the above types of metallic objects cause a disturbance on the electromagnetic field of the search coils but the effects of the disturbance may be distinguished on the basis of how the field is disturbed.

It is therefore an object of the present invention to provide a metal detector incorporating the use of search coils for the detection of metallic objects beneath the surface of the ground.

It is a further object of the present invention to provide a metal detector that may be used not only to detect the presence of a metallic object beneath the surface of the ground but also to present an indication to the operator of the type of metallic object being detected.

Another object of the present invention is to provide a metal detector for distinguishing between generally valuable and non-valuable metallic objects on the basis of the effect on an electromagnetic field caused by the detected object.

These and other objects of the present invention will become apparent to those skilled in the art as the description thereof proceeds.

Briefly, in accordance with the embodiment chosen for illustration, two or more coils are utilized to transmit and receive an electromagnetic field. A first coil is connected into a Hartley oscillator for generating an electromagnetic field, while a second coil is strategically positioned to receive the electromagnetic radiations from the first coil and produce a detected signal. This detected signal is applied to an indicator circuit and to a wave shaping circuit; the wave shaping circuit is utilized to derive a short duration pulse to trigger a flip-flop. The output of the oscillator is also applied to a phase shifter which shifts the phase of the generated signal by a predetermined amount; the shifted signal is applied to a second wave shaping circuit for deriving a triggering signal which is also applied to the above-mentioned flip-flop.

The output of the flip-flop is applied to the indicator circuit for regulating the output of the indicator circuit in accordance with the changes in phase imposed by the phase shift circuit. When a metal object is placed in the electromagnetic field, as will be described more fully hereinafter, both the amplitude and the phase of the detected signal are changed in accordance with the type of metal being detected. The output of the indicator circuit is applied to a meter which may normally be utilized to register midscale under quiescent conditions and will present an increased or decreased reading, depending on both the amplitude change as well as the phase shift change caused by the type of metallic object being detected.

The present invention may be described by reference to the accompanying drawings, in which.

Figure 1:
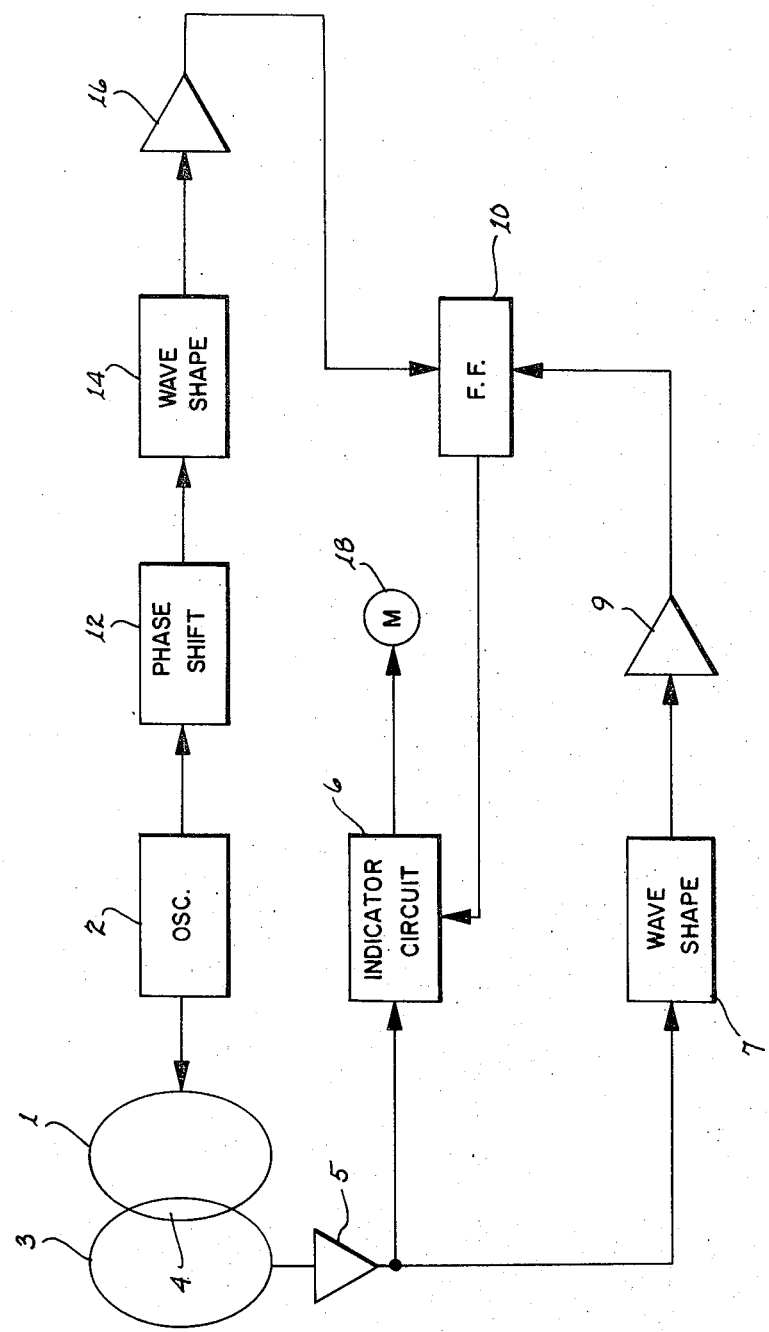
FIG. 1 is a block diagram illustrating, in simplified form, a metal detector constructed in accordance with the teachings of the present invention.

Referring now to FIG. 1, a transmitting coil 1 is shown connected to an oscillator 2; the coil 1 forms part of the oscillator tank circuit. A second coil 3 is positioned in overlapping fashion with respect to the first coil 1. The coils 1 and 3 may be formed in a modified D shape with the relatively straight portions thereof overlapping to provide a relatively narrow area of overlap. The coils are positioned so that there is a null in the receiving coil; they are then separated laterally a few thousandths of an inch so there is a weak signal being received by the receiving coil. When a metallic object is inserted in the electromagnetic field between the coils 1 and 3, the coupling of the coils will be affected and the signal received by the receiving coil 3 will experience an increase in amplitude and a phase shift. The detected signal from the coil 3 is amplified by the amplifier 5 and applied to an indicator circuit 6. The signal is also applied from the amplifier 5 to a wave shaping circuit 7 which is utilized to develop a short duration pulse that may be used, when amplified through amplifier 9, to trigger a flip-flop 10.

The output signals from the oscillator 2 are applied to a phase shift circuit 12 where a predetermined phase shift is imposed thereon. The signal thus shifted is applied to a wave shaping circuit 14 to similarly develop a short duration pulse to be utilized, when amplified through amplifier 16, as a trigger for flip-flop 10. The output of the flip-flop 10 is applied to the indicator circuit; the indicator output is applied to a meter 18. The phase shift circuit 12 is adjusted to provide a predetermined shift in phase of the signal generated by the oscillator 2 relative to the detected signal applied to the indicator circuit from the coil 3 through the amplifier 5. This predetermined shift in the phase may be adjusted so that the meter 18 will read midscale.

When a metal object is placed in the overlapping region 4 between the coils 1 and 3, a change in amplitude of the detected signal is experienced and the indicator circuit 6 would normally provide an output such that the meter 18 would register a higher scale reading than midscale; however, as mentioned previously, the type of metal being detected will not only determine the magnitude of the amplitude change but will also impose a phase shift on the received signal. This received signal, when applied to the wave shaping circuit 7 and amplified by amplifier 9, will trigger the flip-flop 10 at a time relative to the signal applied to the flip-flop from the amplifier 16, depending on the relative phase shift induced by the type of metallic object. The flip-flop imposes a biasing signal on the indicator circuit that tends to decrease the meter reading. The amount by which such biasing signal causes the meter reading to decrease will depend upon the magnitude of the phase shift induced by the metal object. If the phase shift is sufficient, the effect of such phase shift will overcome the effect of the increase in amplitude of the detected signal, and the resultant meter reading will be lower than midscale. Thus, the ratio of the phase shift change to the amplitude change caused by the detection of a particular type of metal is used to distinguish valuable from relatively non-valuable objects.

Figure 2:
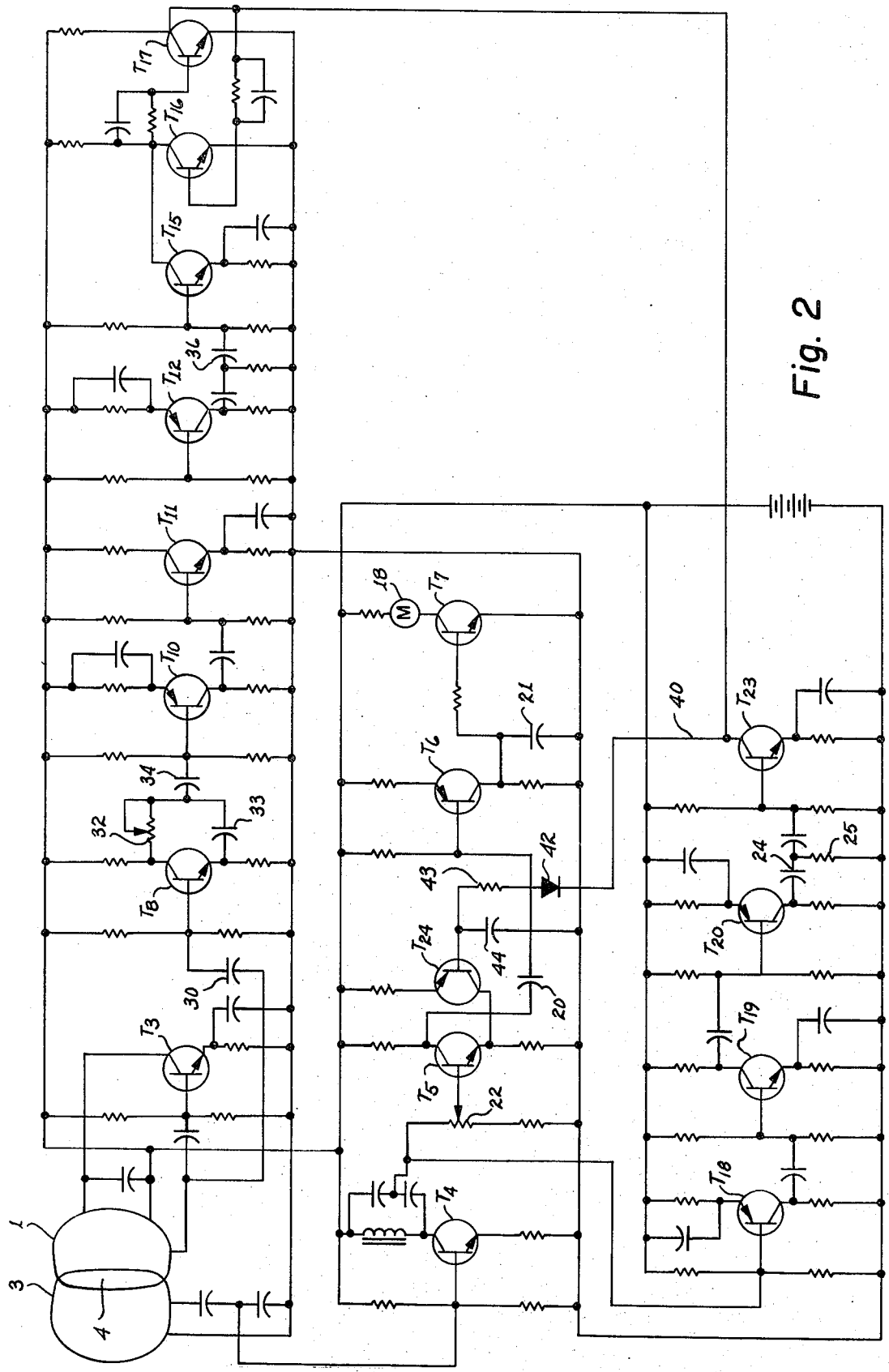
FIG. 2 is a schematic circuit diagram of a metal detector constructed in accordance with the teachings of the present invention.

Referring now to FIG. 2, the coil 1 may be seen to be connected into and be part of the tank circuit of a Hartley oscillator utilizing transistor $T_3$ as the amplifying element. The oscillating electromagnetic field generated by this oscillator is detected by the receiving coil 3. The detected AC signal is applied to transistor $T_4$ which may be recognized as a tuned amplifier receptive to the oscillating frequency of the Hartley oscillator. The output from the amplifier $T_4$ is connected to transistor $T_5$ which, together with transistors $T_6$ and $T_7$, form an indicator circuit, as will be described more fully hereinafter. The meter 18 is placed in the collector circuit of the transistor $T_7$.

The output of transistor $T_5$ is coupled through capacitor 20 to the base electrode of transistor $T_6$. Transistor $T_6$ is biased beyond cutoff and the output on the collector thereof is filtered by capacitor 21 and applied to the base electrode of transistor $T_7$. Transistor $T_7$ is normally biased beyond cutoff but when the rectified DC signal is applied to the base electrode thereof, the output present in the collector electrode will be applied to the meter 18. The circuit thus far described will normally be adjusted by appropriately positioning the coils 1 and 2 and then adjusting the potentiometer 22 in the base of transistor $T_5$ until the meter 18 registers approximately midscale.

It may be seen that under quiescent operating conditions, the AC signals generated by the oscillator and the detected signals received by the coil 3 will result in a midscale meter reading. If a metallic object is placed within the proximity of the overlapping region 4 of the coils 1 and 3, the coupling between the coils 1 and 3 will be changed and the amplitude of the detected signal will be increased which, in turn, will result in an increased meter reading or a deflection of the meter from midscale to an indication of greater amplitude.

The circuit thus far described is therefore capable of detecting the presence of a metal object in the proximity of the overlapping region 4 of the coils 1 and 3 (such presence being indicated by an increase in the meter reading); however, no information is thus far presented to the operator to indicate the type of metal being detected.

The output of transistor $T_4$ is also applied to the base electrode of transistor $T_{18}$; transistors $T_{18}$, $T_{19}$ and $T_{20}$ form a wave shaping circuit to transform the sine wave shape into a square wave having a wave front having a very short rise time. The output of transistor $T_{20}$ is applied to a differentiating circuit formed by capacitor 24 and resistor 25 to produce a pulse amplified by transistor $T_{23}$.

The output from the collector electrode of transistor $T_{23}$ is connected to a flip-flop circuit formed by transistors $T_{16}$ and $T_{17}$. The pulse applied from transistor $T_{23}$ to the collector of transistor $T_{17}$ causes transistor $T_{17}$ to turn on. The output oscillations from transistor $T_3$ are coupled through capacitor 30 to the base electrode of transistor $T_8$ which, together with the variable resistance 32 and capacitor 33, form a phase shifting network. The output of this phase shifting network is coupled through capacitor 34 to the base electrode of transistor $T_{10}$. Transistors $T_{10}$, $T_{11}$ and $T_{12}$ form a wave shaping circuit which ultimately produces a pulse similar to that described in connection with transistors $T_{18}$, $T_{19}$ and $T_{20}$. This pulse (which is now phase shifted relative to the original oscillator signal) is coupled through capacitor 36 to transistor $T_{15}$ which amplifies the pulse and applies it to the collector electrode of transistor $T_{16}$. Application of the pulse from transistor $T_{15}$ to transistor $T_{16}$ causes transistor $T_{16}$ to turn on and transistor $T_{17}$ to turn off.

Under quiescent conditions, the phase shift is adjusted by the variable resistance 32 to produce an "on" time for transistor $T_{17}$ of a predetermined duration. In the embodiment chosen for illustration, approximately two microseconds has been found to operate satisfactorily. The collector electrode of transistor $T_{17}$, as well as the collector electrode of transistor $T_{23}$, is connected through conductor 40 to a diode 42. The pulse generated by the on time of $T_{17}$ and having a duration of the on time of transistor $T_{17}$ is thus coupled through the diode 42, filtered by capacitor 44 to provide a DC bias applied to the base electrode of transistor $T_{24}$; the collector electrode of transistor $T_{24}$ is connected to the emitter electrode of transistor $T_5$. When the transistor $T_{24}$ conducts, it tends to turn transistor $T_5$ off. Under such conditions, with the transistor $T_5$ cut off, the meter 18 would tend to deviate from midscale to zero; however, the potentiometer 22 connected to the base electrode of transistor $T_5$ is adjusted under quiescent conditions until transistor $T_5$ conducts during a sufficient time during each swing of the AC signal applied to the base thereof from $T_4$ that the meter 18 again reads midscale. Selection of the value of resistor 43 has been found to be important to provide the proper operation of transistor $T_{24}$ in cutting off transistor $T_5$.

An increased phase shift resulting from the detection of a metalic object would increase the duration of the on time of transistor $T_{17}$. The pulses produced during each such on time, when filtered by capacitor 44, would result in a DC bias of greater amplitude. This increased bias tends to cut transistor $T_5$ off sooner in each swing of the AC signal applied to the base thereof from $T_4$. The resulting signal applied from $T_5$ to the base of $T_6$ has been decreased in amplitude and the meter reading therefor tends to decrease.

In operation, with the circuit operating in its quiescent state and the meter 18 reading on midscale, when the coils 1 and 3 are passed over the ground and a metal object beneath the surface of the ground passes in the electromagnetic field in the overlap portion 4 between the coils 1 and 3, both the amplitude and the phase of the signal received by the coil 3 are changed. The change in the amplitude as well as the change in the phase will depend on the type of metal being detected. It has been found that metal objects generally considered to be valuable, such as coins and the like, cause an increase in the amplitude of the detected signal but only a small change in the phase shift; therefore, the meter 18 will indicate an increased amplitude and will be deflected from midscale to a higher reading. It has also been found that metallic objects generally considered to be worthless, such as bottle caps, pulltabs, aluminum foil and large iron objects, will also produce an increase in the amplitude of the detected signal; however, a signal phase shift will also be imposed on the received signal and, while the increased amplitude of the received signal would otherwise tend to increase the meter reading, the increased phase shift results in an increase in the DC bias tending to cut transistor $T_5$ off sooner in each swing of the AC signal applied to the base thereof from $T_4$. The amplitude of the signal applied to the base of $T_6$ would therefor be reduced and the meter reading would tend to be reduced. As a result of the detection of amplitude as well as phase changes caused by differing metallic objects, the meter 18 presents an indication of the detection of a valuable metallic object (an increased reading) or a generally worthless object (a decreased reading).

It may be possible to utilize more than two coils; however, it is believed that a configuration utilizing two overlapped coils is the least complicated and least expensive of the possibilities. It has also been found that while a variety of frequencies may be utilized, an operating frequency of approximately 15 kHz is optimum and the on period for transistor $T_{17}$ of approximately 2 microseconds produces good results.

I claim:

1. A metal detector for detecting the presence of, and distinguishing between, certain types of metallic objects, comprising: an oscillator; a transmitting coil connected to said oscillator for transmitting electromagnetic signals generated by said oscillator; a receiving coil mounted in proximity to said transmitting coil for receiving electromagnetic signals transmitted by said transmitting coil, the received electromagnetic signals being changed in amplitude and phase when a metallic object is placed in the path of said electromagnetic signal transmitted by said transmitting coil; an indicator means for providing a reading to an operator when a metallic object has been detected, said indicator means including a meter and an indicator circuit for receiving electromagnetic signals from said receiving coil and providing a DC current to said meter in response thereto, said indicator circuit responsive to biasing to reduce said DC current and reduce the meter reading; means connected to said indicator means and to said receiving coil responsive to an increase in amplitude of said received signals for increasing the reading of said indicator means; first wave shaping means connected to said receiving coil for producing a first short duration pulse; a phase shift circuit connected to said oscillator for imposing a predetermined phase shift upon electromagnetic signals generated by said oscillator; a second wave shaping means connected to said phase shift circuit for producing a second short duration pulse; and means connected to receive said first and second short duration pulses and connected to said indicator circuit for applying the biasing thereto for decreasing the reading of said meter.

2. The combination set forth in claim 1, wherein said means for increasing the reading of said indicator includes an amplifier for receiving, amplifying, and transmitting electromagnetic signals from said receiving coil to said indicator means.

3. The combination set forth in claim 1 wherein said means connected to receive said first and second short duration pulses is a flip-flop.

* * * * *